(12) United States Patent
Muramoto et al.

(10) Patent No.: US 12,242,149 B2
(45) Date of Patent: *Mar. 4, 2025

(54) DISPLAY DEVICE

(71) Applicant: Japan Display Inc., Tokyo (JP)

(72) Inventors: Tatsunori Muramoto, Tokyo (JP); Kentaro Kawai, Tokyo (JP); Yoshihide Ohue, Tokyo (JP); Kentaro Okuyama, Tokyo (JP); Tenfu Nakamura, Tokyo (JP); Koji Kitamura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/638,803

(22) Filed: Apr. 18, 2024

(65) Prior Publication Data

US 2024/0264481 A1 Aug. 8, 2024

Related U.S. Application Data

(63) Continuation of application No. 18/350,797, filed on Jul. 12, 2023, now Pat. No. 11,988,915, which is a
(Continued)

(30) Foreign Application Priority Data

Jan. 14, 2021 (JP) ................. 2021-004111

(51) Int. Cl.
*G02F 1/1343* (2006.01)
*G02F 1/1334* (2006.01)
(Continued)

(52) U.S. Cl.
CPC ...... *G02F 1/1334* (2013.01); *G02F 1/133512* (2013.01); *G02F 1/1339* (2013.01); *G02F 1/134309* (2013.01)

(58) Field of Classification Search
CPC ............. G02F 1/1334; G02F 1/133512; G02F 1/1339; G02F 1/134309; G02F 1/133616
See application file for complete search history.

(56) References Cited

U.S. PATENT DOCUMENTS 5,822,028 A 10/1998 Miyawaki
11,988,915 B2 * 5/2024 Muramoto ........ G02F 1/133512
(Continued)

FOREIGN PATENT DOCUMENTS

JP H09-138390 A 5/1997
JP 2000-47602 A 2/2000
(Continued)

OTHER PUBLICATIONS

JP 2019211666 A machine translation (Year: 2019).*
(Continued)

*Primary Examiner* — James A Dudek
(74) *Attorney, Agent, or Firm* — Michael Best & Friedrich LLP

(57) ABSTRACT

According to one embodiment, a display device includes a first substrate, a second substrate, a sealant formed bonding the first substrate with the second substrate, a liquid crystal layer surrounded by the sealant, and a light emitting module. The sealant includes a first portion, a second portion opposed to the first portion with the liquid crystal layer sandwiched therebetween, an inlet formed in the second portion, and a filling material filled in the inlet. The liquid crystal layer is arranged over a display area where an image is displayed, a first area between the display area and the first portion, and a second area between the display area and the second portion, in plan view. A first width of the first area is larger than a width of the second area.

5 Claims, 14 Drawing Sheets

Related U.S. Application Data continuation of application No. PCT/JP2021/042291, filed on Nov. 17, 2021.

(51) Int. Cl.
*G02F 1/1335* (2006.01)
*G02F 1/1339* (2006.01)

(56) References Cited

U.S. PATENT DOCUMENTS

| | | |
|---|---|---|
| 2008/0007674 A1 | 1/2008 | Akiyama et al. |
| 2012/0099067 A1 | 4/2012 | Hara et al. |
| 2019/0079324 A1* | 3/2019 | Numata ................ G02F 1/1334 |
| 2020/0166796 A1 | 5/2020 | Okuyama et al. |
| 2021/0232010 A1 | 7/2021 | Numata et al. |

FOREIGN PATENT DOCUMENTS

| | | |
|---|---|---|
| JP | 2003-177426 A | 6/2003 |
| JP | 2012-108464 A | 6/2012 |
| JP | 2020-64252 A | 4/2020 |
| JP | 2020-86089 A | 6/2020 |

OTHER PUBLICATIONS

JP 2019219565 A machine translation (Year: 2019).*
Japanese Office Action dated Oct. 15, 2024, for the corresponding Japanese Patent Application No. 2024-026470, with English machine translation.
Extended European Search Report dated Nov. 4, 2024, for the corresponding European Application No. 21919554.2.

* cited by examiner

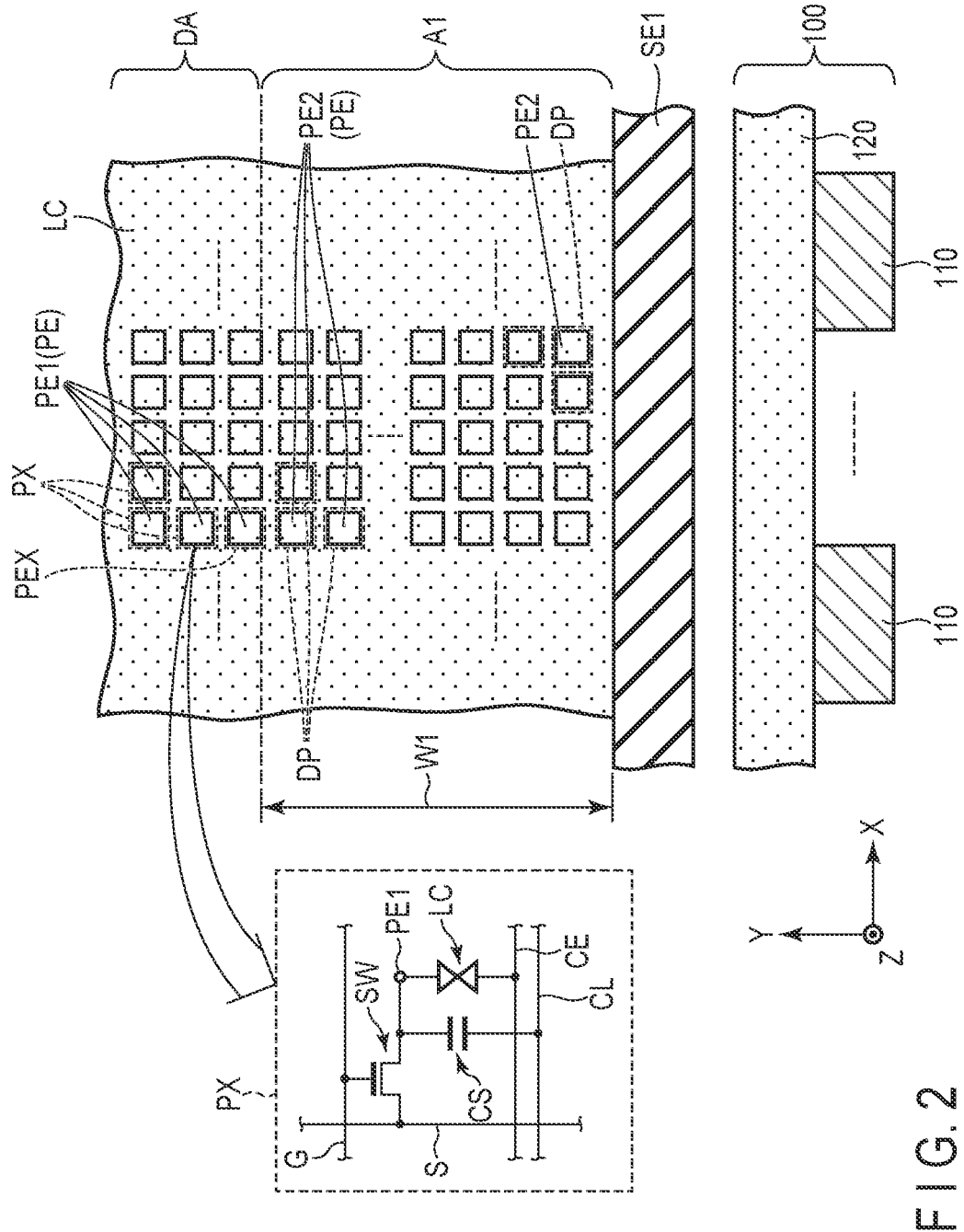
F I G. 2

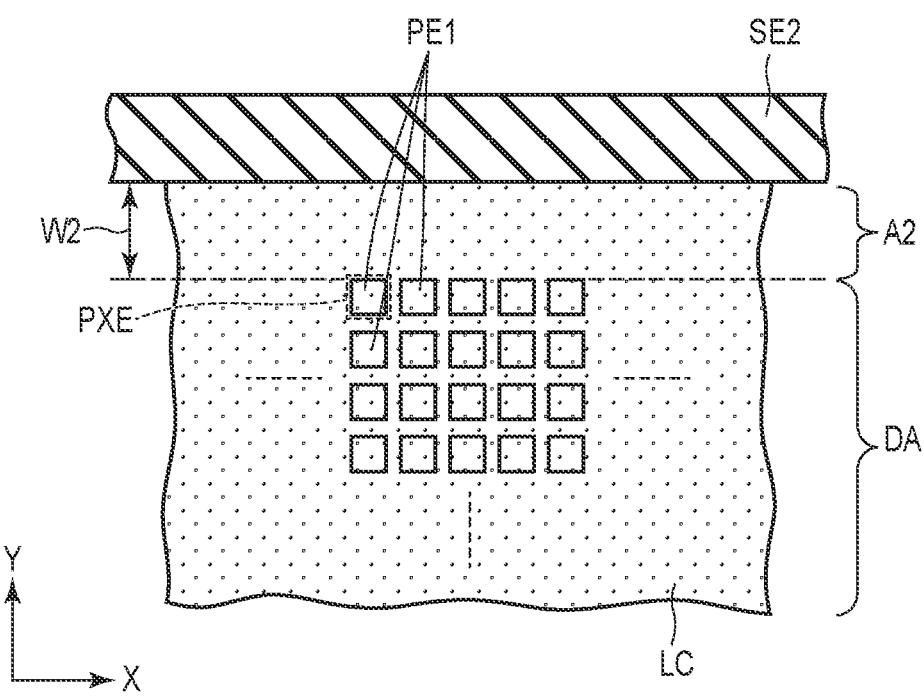
F I G. 3

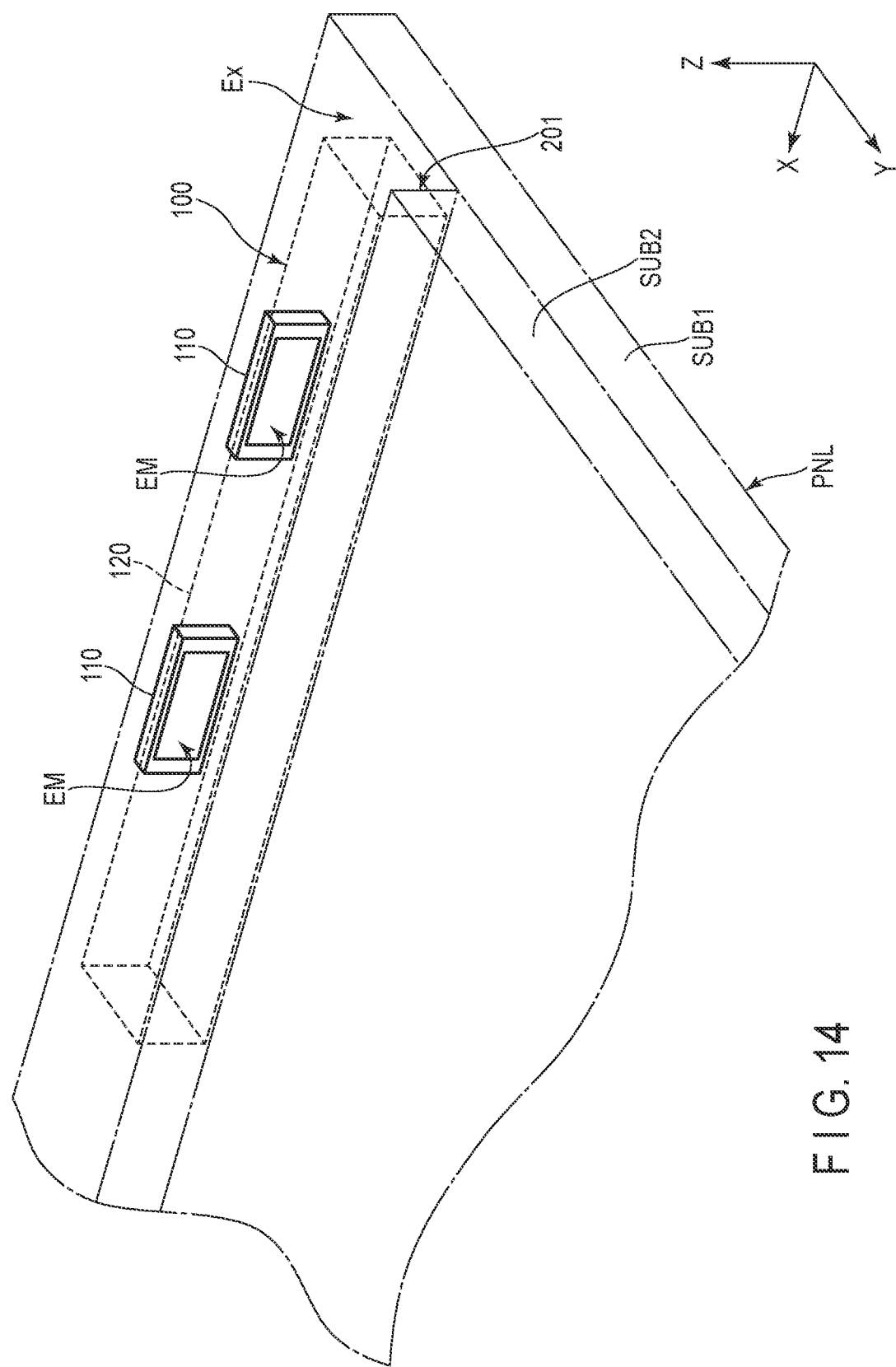
F I G. 14

DISPLAY DEVICE

CROSS-REFERENCE TO RELATED APPLICATIONS

This application is a Continuation Application of U.S. patent application Ser. No. 18/350,797, filed on Jul. 12, 2023, which, in turn, is a Continuation Application of PCT Application No. PCT/JP2021/042291, filed Nov. 17, 2021 and based upon and claiming the benefit of priority from Japanese Patent Application No. 2021-004111, filed Jan. 14, 2021, the entire contents of all of which are incorporated herein by reference.

FIELD

Embodiments described herein relate generally to a display device.

BACKGROUND

In recent years, various display devices using a polymer dispersed liquid crystal capable of switching a scattered state in which incident light is scattered and a transparent state in which incident light is transmitted have been proposed. In one example, a display device comprising a first translucent substrate, a second translucent substrate, a liquid crystal layer containing polymer dispersed liquid crystal sealed between the first translucent substrate and the second translucent substrate, and at least one light emitting unit opposed to at least one side surface of the first translucent substrate and the second translucent substrate is disclosed.

BRIEF DESCRIPTION OF THE DRAWINGS

FIG. 2 is a plan view showing an area including a first area A1 shown in FIG. 1.

FIG. 3 is a plan view showing an area including a second area A2 shown in FIG. 1.

FIG. 14 is a perspective view showing a state in which the light emitting module 100 shown in FIG. 13 is arranged on the display panel PNL.

DETAILED DESCRIPTION

Figure 1:
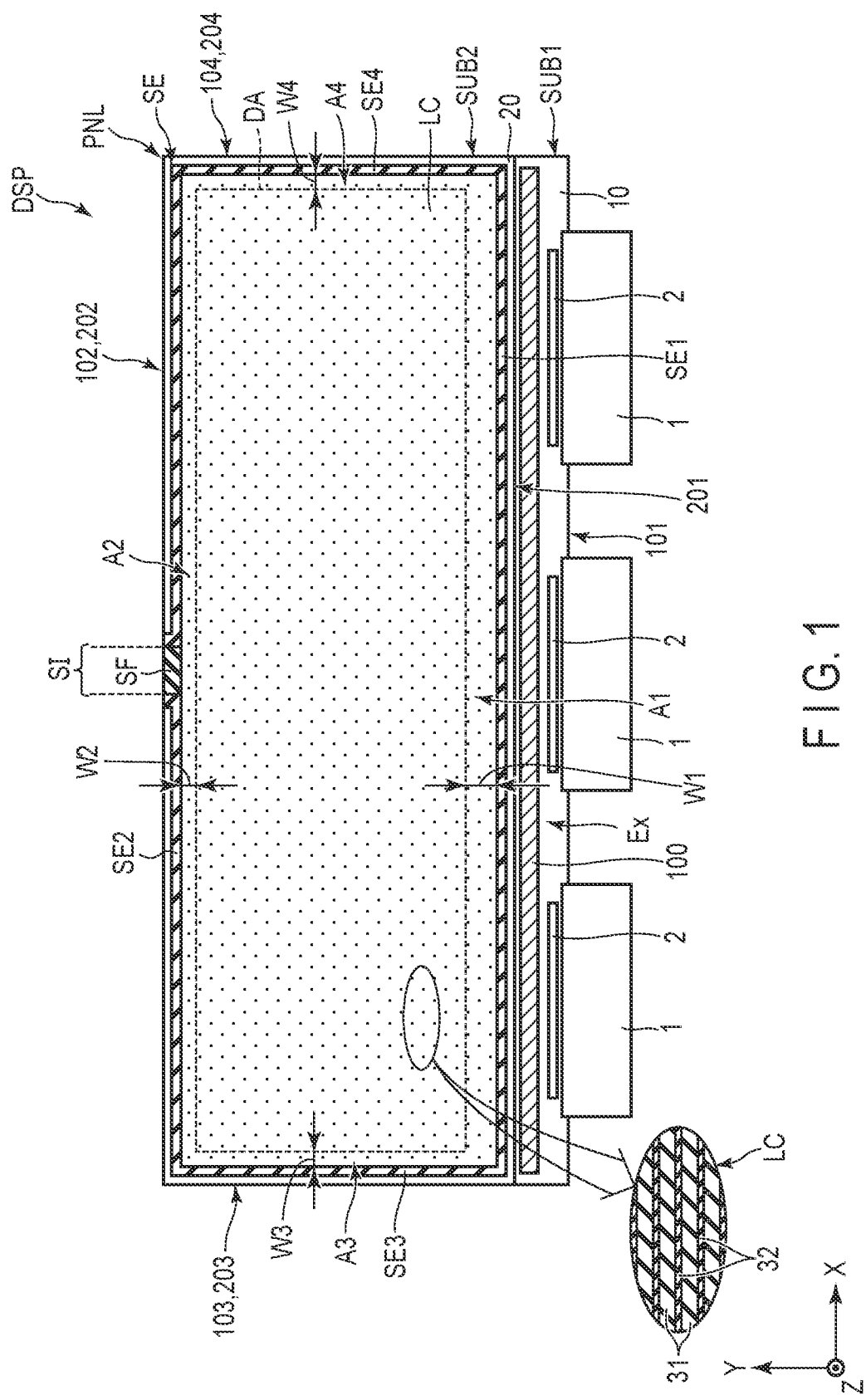
FIG. 1 is a plan view showing an example of a display device DSP according to embodiments.

Embodiments described herein aim to provide a display device capable of suppressing the degradation in display quality.

In general, according to one embodiment, a display device comprises a first substrate comprising a first transparent substrate and a plurality of pixel electrodes arranged on the first transparent substrate, a second substrate comprising a second transparent substrate having a side surface and a common electrode opposed to the plurality of pixel electrodes, a sealant formed in a rectangular frame shape and bonding the first substrate with the second substrate, a liquid crystal layer surrounded by the sealant between the first substrate and the second substrate and containing polymer dispersed liquid crystal, and a light emitting module arranged along the side surface, and the sealant includes a first portion along the side surface, a second portion opposed to the first portion with the liquid crystal layer sandwiched therebetween, an inlet formed in the second portion, and a filling material filled in the inlet, the liquid crystal layer is arranged over a display area where an image is displayed, a first area between the display area and the first portion, and a second area between the display area and the second portion, in plan view, and a first width of the first area is larger than a width of the second area.

According to the embodiments, a display device capable of suppressing the degradation in display quality can be provided.

Embodiments will be described hereinafter with reference to the accompanying drawings. The disclosure is merely an example, and proper changes within the spirit of the invention, which are easily conceivable by a person of ordinary skill in the art, are included in the scope of the invention as a matter of course. In addition, in some cases, in order to make the description clearer, the widths, thicknesses, shapes and the like, of the respective parts are schematically illustrated in the drawings, compared to the actual modes. However, the schematic illustration is merely an example, and adds no restriction to the interpretation of the invention. In addition, in the specification and drawings, structural elements which function in the same or a similar manner to those described in connection with preceding drawings are denoted by like reference numbers, detailed description thereof being omitted unless necessary.

FIG. 1 is a plan view showing an example of a display device DSP according to the embodiments. For example, a first direction X, a second direction Y, and a third direction Z are orthogonal to each other but may intersect at an angle other than 90 degrees. The first direction X and the second direction Y correspond to the directions parallel to the main surface of a substrate constituting the display device DSP, and the third direction Z corresponds to a thickness direction of the display device DSP. In the embodiments, viewing an X-Y plane defined by the first direction X and the second direction Y is referred to as plan view.

The display device DSP comprises a display panel PNL, a wiring board 1, an IC chip 2, and a light emitting module 100.

The display panel PNL comprises a first substrate SUB1, a second substrate SUB2, a liquid crystal layer LC containing polymer dispersed liquid crystal, and a sealant SE. The first substrate SUB1 and the second substrate SUB2 are formed in a flat plate shape parallel to the X-Y plane. The first substrate SUB1 and the second substrate SUB2 overlap in plan view. An area where the first substrate SUB1 and the second substrate SUB2 overlap includes a display area DA where images are displayed.

The first substrate SUB1 comprises a first transparent substrate 10, and the second substrate SUB2 comprises a second transparent electrode 20. The first transparent substrate 10 has side surfaces 101 and 102 along the first direction X and side surfaces 103 and 104 along the second direction Y. The second transparent substrate 20 has side surfaces 201 and 202 along the first direction X and side surfaces 203 and 204 along the second direction Y.

In the example shown in FIG. 1, the side surfaces 102 and 202, the side surfaces 103 and 203, and the side surfaces 104 and 204 overlap, respectively, in plan view, but may not necessarily overlap. The side surface 201 does not overlap with the side surface 101 but is located between the side surface 101 and the display area DA. The first substrate SUB1 includes an extending portion Ex between the side surface 101 and the side surface 201. In other words, the extending portion Ex corresponds to a portion of the first substrate SUB1, which extends in the second direction Y from a portion overlapping with the second substrate SUB2, and does not overlap with the second substrate SUB2.

In addition, in the example shown in FIG. 1, the display panel PNL is formed in a rectangular shape extending in the first direction X. In other words, the side surfaces 101 and 102 and the side surfaces 201 and 202 are side surfaces along the long sides of the display panel PNL, and the side surfaces 103 and 104 and the side surfaces 203 and 204 are side surfaces along the short sides of the display panel PNL. The display panel PNL may be formed in a rectangular shape extending in the second direction Y, a square shape, the other polygonal shape, or the other shape such as a circular shape or an elliptical shape.

The wiring board 1 and the IC chip 2 are mounted on the extending portion Ex. The wiring board 1 is, for example, a flexible printed circuit board which can be bent. The IC chip 2 incorporates, for example, a display driver which outputs a signal necessary for image display, and the like. The IC chip 2 may be mounted on the wiring board 1. In the example shown in FIG. 1, a plurality of wiring boards 1 arranged in the first direction X are mounted on the display panel PNL, but a single wiring board 1 extending in the first direction X may be mounted. In addition, a plurality of IC chips 2 arranged in the first direction X are mounted on the display panel PNL, but a single IC chip 2 extending in the first direction X may be mounted.

Details of the light emitting module 100 will be described later, but the light emitting module 100 overlaps with the extending portion Ex and is arranged along the side surface 201 of the second transparent substrate 20, in plan view.

The sealant SE bonds the first substrate SUB1 and the second substrate SUB2. In addition, the sealant SE is formed in a rectangular frame shape, and surrounds the liquid crystal layer LC between the first substrate SUB1 and the second substrate SUB2. This sealant SE includes a first part SE1, a second part SE2 opposed to the first part SE1 with the liquid crystal layer LC sandwiched therebetween, a third part SE3, and a fourth part SE4 opposed to the third part SE3 with the liquid crystal layer LC sandwiched therebetween. The first part SE1 and the second part SE2 extend along the first direction X. The third part SE3 and the fourth part SE4 extend along the second direction Y to connect the first part SE1 with the second part SE2.

In addition, the sealant SE includes an inlet SI formed in the second part SE2, and a filling material SF filled in the inlet SI. The inlet SI is a liquid crystal injection port for injection of the liquid crystal material.

The liquid crystal layer LC is held between the first substrate SUB1 and the second substrate SUB2. This liquid crystal layer LC is arranged in the display area DA in plan view. In addition, the liquid crystal layer LC is arranged over a non-display area around the display area DA, i.e., a first area A1 between the display area DA and the first part SE1, a second area A2 between the display area DA and the second part SE2, a third area A3 between the display area DA and the third part SE3, and a fourth area A4 between the display area DA and the fourth part SE4.

In the embodiments, the first area A1 is formed to be larger in width than any one of the second area A2, the third area A3, and the fourth area A4. In other words, the first area A1 has a width (first width) W1 along the second direction Y between the first part SE1 and the display area DA, the second area A2 has a width (second width) W2 along the second direction Y between the second part SE2 and the display area DA, the third area A3 has a width (third width) W3 along the first direction X between the third part SE3 and the display area DA, and the fourth area A4 has a width (fourth width) W4 along the first direction X between the fourth part SE4 and the display area DA.

The first width W1 is larger than the second width W2 (W1>W2).

In addition, the first width W1 is larger than any one of the third width W3 and the fourth width W4 (W1>W3, W1>W4).

As enlarged and schematically shown in FIG. 1, the liquid crystal layer LC contains polymer 31 and liquid crystal molecules 32. As an example, the polymer 31 is liquid crystalline polymer. The polymer 31 is formed in a stripe shape extending along the first direction X and is arranged in the second direction Y. The liquid crystal molecules 32 are dispersed in gaps of the polymer 31 and aligned such that their long axes extend along the first direction X. Each of the polymer 31 and the liquid crystal molecules 32 has optical anisotropy or refractive anisotropy. The response performance of the polymer 31 to the electric field is lower than the response performance of the liquid crystal molecules 32 to the electric field.

As an example, the alignment direction of the polymer 31 is hardly varied irrespective of the presence or absence of the electric field. In contrast, the alignment direction of the liquid crystal molecules 32 is varied in accordance with the electric field in a state in which a voltage higher than or equal to a threshold value is applied to the liquid crystal layer LC. In a state in which the voltage is not applied to the liquid crystal layer LC (initial alignment state), optical axes of the polymer 31 and the liquid crystal molecules 32 are parallel to each other and the light made incident on the liquid crystal layer LC is almost transmitted through the liquid crystal layer LC (transparent state). In a state in which a voltage is applied to the liquid crystal layer LC, the alignment direction of the liquid crystal molecules 32 changes, and the optical axes of the respective polymer 31 and liquid crystal molecules 32 intersect with each other. Therefore, the light made incident on the liquid crystal layer LC is scattered in the liquid crystal layer LC (scattered state).

FIG. 2 is a plan view showing an area including the first area A1 shown in FIG. 1. The light emitting module 100 comprises a plurality of light emitting elements 110 and a light guide 120. The plurality of light emitting elements 110 are arranged in the first direction X. The light guide 120 is formed in a rod shape extending in the first direction X. The light guide 120 is located between the first part SE1 of the sealant SE and the light emitting elements 110.

The display area DA includes a plurality of pixels PX arrayed in a matrix in the first direction X and the second direction Y. The first area A1 includes a plurality of dummy pixels DP arrayed in a matrix in the first direction X and the second direction Y. These pixels PX and dummy pixels DP are represented by dotted lines in the figure. In addition, each of the pixels PX and the dummy pixels DP comprises a pixel electrode PE represented by a square of a solid line in the figure. The pixel electrode included in each pixel PX in the display area DA is referred to as a first pixel electrode PE1, and the pixel electrode included in the dummy pixel DP in the first area A1 is referred to as a second pixel electrode PE2. As an example, five to twenty dummy pixels DP are arranged along the second direction Y between the first part SE1 and the display area DA, in the first area A1. The first width W1 of the first area A1 can be defined as a length between the first pixel electrode PE1 of a pixel PXE in an outermost periphery and the first part SE1, in the display area DA.

As shown and enlarged in FIG. 2, each pixel PX comprises a switching element SW. The switching element SW is constituted by, for example, a thin-film transistor (TFT) and is electrically connected to the scanning line G and the signal line S. The scanning line G is electrically connected to the switching element SW in each of the pixels PX arranged in the first direction X. The signal line S is electrically connected to the switching element SW in each of the pixels PX arranged in the second direction Y. The first pixel electrode PE1 is electrically connected to the switching element SW.

A common electrode CE and a feed line CL are arranged over the display area DA and the first area A1. A common voltage Vcom is applied to the common electrode CE. For example, a voltage having the same potential as the common electrode CE is applied to the feed line CL.

Each of the first pixel electrodes PE1 is opposed to the common electrode CE in the third direction Z. In the display area DA, the liquid crystal layer LC (particularly, liquid crystal molecules 32) is driven by an electric field produced between the first pixel electrode PE1 and the common electrode CE. For example, a capacitance CS is formed between the feed line CL and the first pixel electrode PE1.

In contrast, the second pixel electrode PE2 is electrically connected to the feed line CL, in the dummy pixel DP. Each of the second pixel electrodes PE2 is opposed to the common electrode CE in the third direction Z. However, since a potential of the second pixel electrode PE2 is the same as the potential of the common electrode CE, the electric field to drive the liquid crystal layer LC is not produced in the first area A1.

The scanning line G, the signal line S, the feed line CL, the switching element SW, the first pixel electrode PE1, and the second pixel electrode PE2 are provided on the first substrate SUB1, and the common electrode CE is provided on the second substrate SUB2, which will be described later.

FIG. 3 is a plan view showing an area including the second area A2 shown in FIG. 1. In the second area A2, dummy pixels DP as arranged in the first area A1 are not arranged. In other words, the pixel electrode is not arranged between the first pixel electrode PE1 of the pixel PXE in the outermost periphery and the second part SE2, in the display area DA. The second width W2 of the second area A2 can be defined as a length between the first pixel electrode PE1 of the pixel PXE in the outermost periphery and the second part SE2, in the display area DA.

Figure 4:
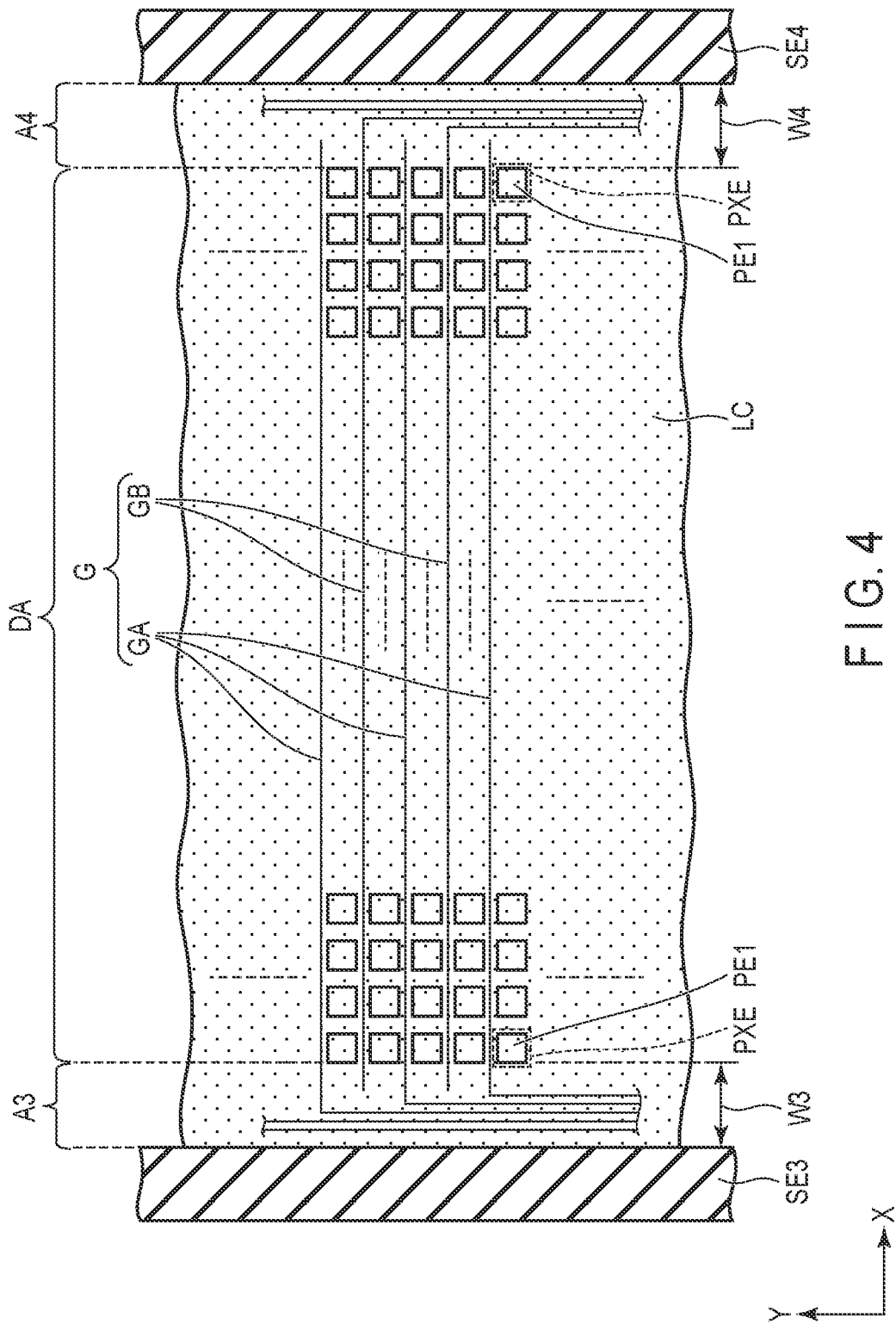
FIG. 4 is a plan view showing an area including a third area A3 and a fourth area A4 shown in FIG. 1.

FIG. 4 is a plan view showing an area including a third area A3 and a fourth area A4 shown in FIG. 1. In the third area A3 and the fourth area A4, dummy pixels DP as arranged in the first area A1 are not arranged. In other words, the pixel electrodes are not arranged between the first pixel electrode PE1 of the pixel PXE in the outermost periphery on the left side of the figure and the third part SE3, and between the first pixel electrode PE1 of the pixel PXE in the outermost periphery on the right side of the figure and the fourth part SE4, in the display area DA.

The third width W3 of the third area A3 can be defined as a length between the first pixel electrode PE1 of the pixel PXE in the outermost periphery and the third part SE3, in the display area DA. The fourth width W4 of the fourth area A4 can be defined as a length between the first pixel electrode PE1 of the pixel PXE in the outermost periphery and the fourth part SE4, in the display area DA.

Each of the plurality of scanning lines G extends along the first direction X, and the scanning lines are arranged at intervals in the second direction Y, in the display area DA. In the example shown in FIG. 4, odd-numbered scanning lines GA of the plurality of scanning lines G are drawn to the third area A3, and even-numbered scanning lines GB are drawn to the fourth area A4.

Figure 5:
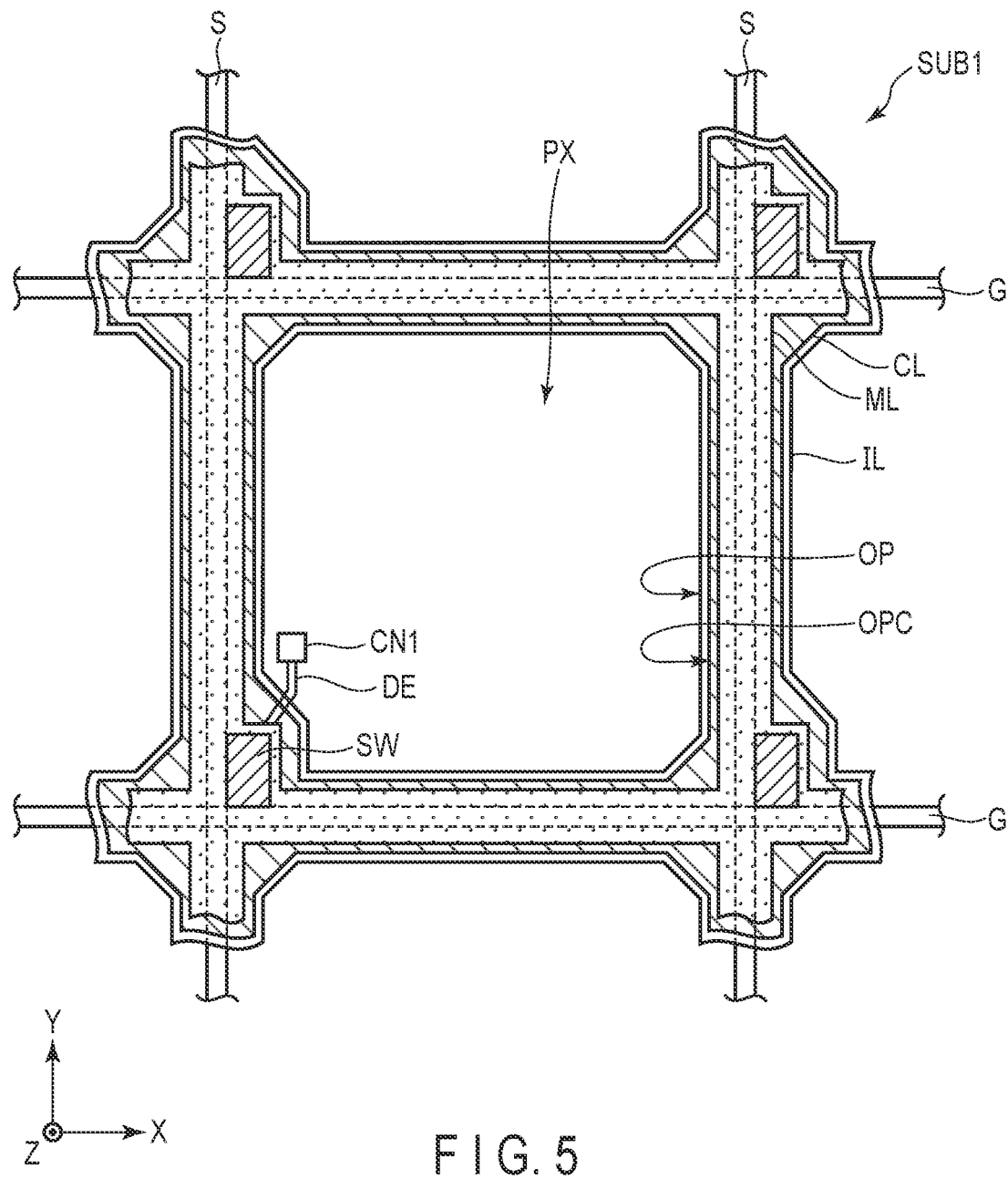
FIG. 5 is a plan view showing an example of a pixel PX.

FIG. 5 is a plan view showing an example of the pixel PX. Only a part of the configuration included in the first substrate SUB1 is shown in the figure.

The first substrate SUB1 comprises a plurality of scanning lines G, a plurality of signal lines S, a switching element SW, a feed line CL, a metal line ML, and an insulating film IL.

As described above, each of the plurality of scanning lines G extends in the first direction X. Each of the plurality of signal lines S extends in the second direction Y and intersects the plurality of scanning lines G. In the present specification, the pixel PX corresponds to an area defined by two adjacent scanning lines G and two adjacent signal lines S. The switching element SW is arranged at an intersection of the scanning line G and the signal line S.

The insulating film IL is formed in a grating pattern which defines an opening OP in each pixel PX. The insulating film IL is, for example, an organic insulating film. The insulating film IL overlaps with each of the scanning lines G, the signal lines S, and the switching element SW. However, a drain electrode DE of the switching element SW extends to the opening OP. The connection electrode CN1 is formed in an island shape, located at the opening OP, and electrically connected to one end portion of the drain electrode DE.

The feed line CL is arranged on the insulating film IL and is formed in a grating pattern surrounding the pixel PX. The feed line CL is separated from the connection electrode CN1. An opening OPC of the feed line CL overlaps with the opening OP of the insulating film IL. The metal line ML is arranged on the feed line CL and is formed in a grating pattern surrounding the pixel PX. Each of the feed line CL and the metal line ML overlaps with the scanning lines G, the signal lines S, and the switching elements SW.

Figure 6:
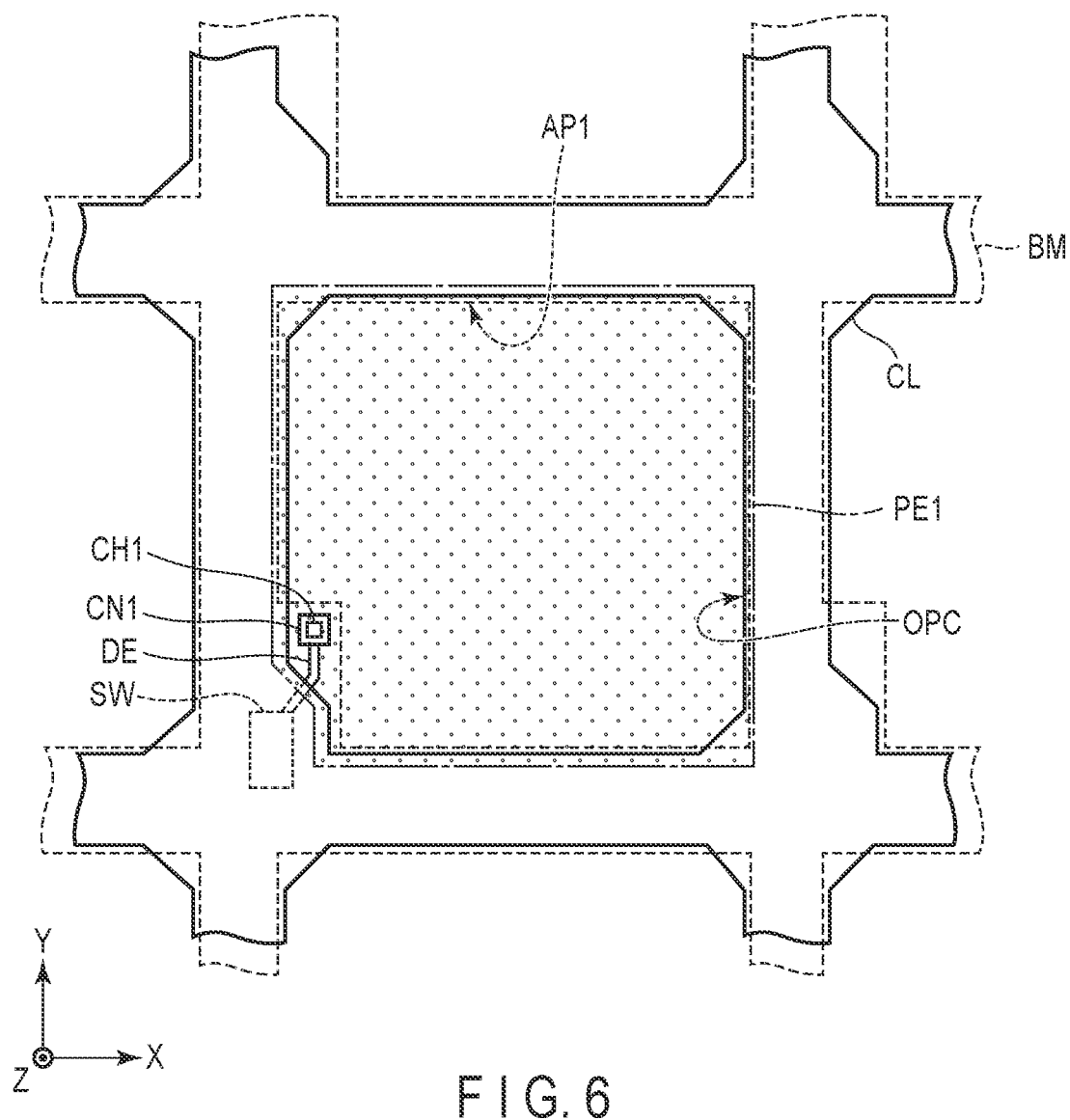
FIG. 6 is a plan view showing an example of a first pixel electrode PE1 arranged in the pixel PX shown in FIG. 5.

FIG. 6 is a plan view showing an example of a first pixel electrode PE1 arranged in the pixel PX shown in FIG. 5. The first pixel electrode PE1 represented by a one-dot chain line overlaps with the opening OPC of the feed line CL. In addition, a peripheral portion of the first pixel electrode PE1 overlaps with the feed line CL. An insulating film is interposed between the first pixel electrode PE1 and the feed line CL, and the capacitance CS shown in FIG. 2 is formed between the peripheral portion of the first pixel electrode PE1 and the feed line CL.

In addition, the first pixel electrode PE1 overlaps with the connection electrode CN1 at the opening OPC. A contact hole CH1 is formed in an insulating film interposed between the first pixel electrode PE1 and the connection electrode CN1. The first pixel electrode PE1 is in contact with the connection electrode CN1 in the contact hole CH1. The first pixel electrode PE1 is thereby electrically connected to the switching element SW.

A light-shielding layer BM provided on the second substrate SUB2 is represented by a dotted line in FIG. 6. The light-shielding layer BM is formed in a grating pattern and overlaps with the feed line CL, the switching element SW, the connection electrode CN1, and the like in plan view. Of course, the light-shielding layer BM also overlaps with the scanning line G, the signal line S, and the metal line ML shown in FIG. 5. In addition, the light-shielding layer BM includes an aperture AP1 which overlaps with the first pixel electrode PE1, in plan view.

Figure 7:
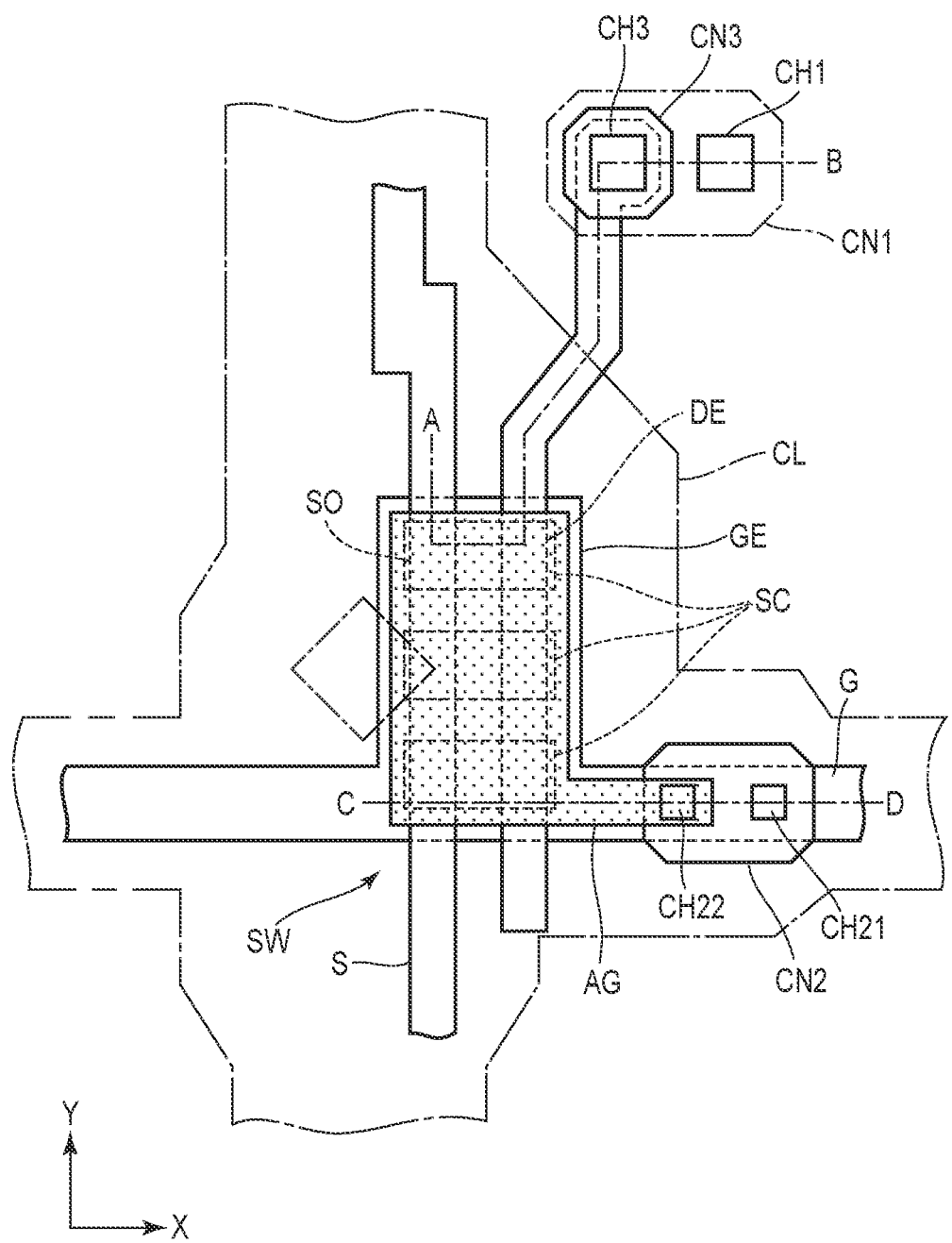
FIG. 7 is a plan view showing an example of the switching element SW shown in FIG. 6.

FIG. 7 is a plan view showing an example of the switching element SW shown in FIG. 6. The switching element SW comprises a semiconductors SC, a gate electrode GE integrated with the scanning line G, a source electrode SO integrated with the signal line S, the drain electrode DE, and an auxiliary gate electrode AG. The feed line CL represented by a one-dot chain line overlaps with the switching element SW.

The semiconductor SC is, for example, an oxide semiconductor, but may be polycrystalline silicon or amorphous silicon. In the example shown in FIG. 7, three semiconductors SC overlap with the gate electrode GE and are arranged at intervals along the second direction Y. The auxiliary gate electrode AG overlaps with the gate electrode GE and the semiconductors SC. In addition, the auxiliary gate electrode AG overlaps with the scanning line G. A connection electrode CN2 is interposed between the scanning line G and the auxiliary gate electrode AG.

A contact hole CH21 is formed in an insulating film interposed between the scanning line G and the connection electrode CN2. The connection electrode CN2 is in contact with the scanning line G in the contact hole CH21. A contact hole CH22 is formed in an insulating film interposed between the connection electrode CN2 and the auxiliary gate electrode AG. The auxiliary gate electrode AG is in contact with the connection electrode CN2 in the contact hole CH22. The auxiliary gate electrode AG is thereby electrically connected to the scanning line G, similarly to the gate electrode GE.

The source electrode SO and the drain electrode DE are arranged at an interval along the first direction X. The source electrode SO is in contact with one end side of each of the semiconductors SC. The drain electrode DE is in contact with the other end side of each of the semiconductors SC.

One end portion of the drain electrode DE overlaps with a connection electrode CN3. A contact hole CH3 is formed in an insulating film interposed between the drain electrode DE and the connection electrode CN3. The drain electrode DE is in contact with the connection electrode CN3 in the contact hole CH3. The connecting electrode CN1 represented by a one-dot chain line is in contact with the connection electrode CN3. Thus, the connection electrode CN1 is electrically connected to the switching element SW, and is electrically connected to the first pixel electrode PE1 shown in FIG. 6 in the contact hole CH1.

Figure 8:
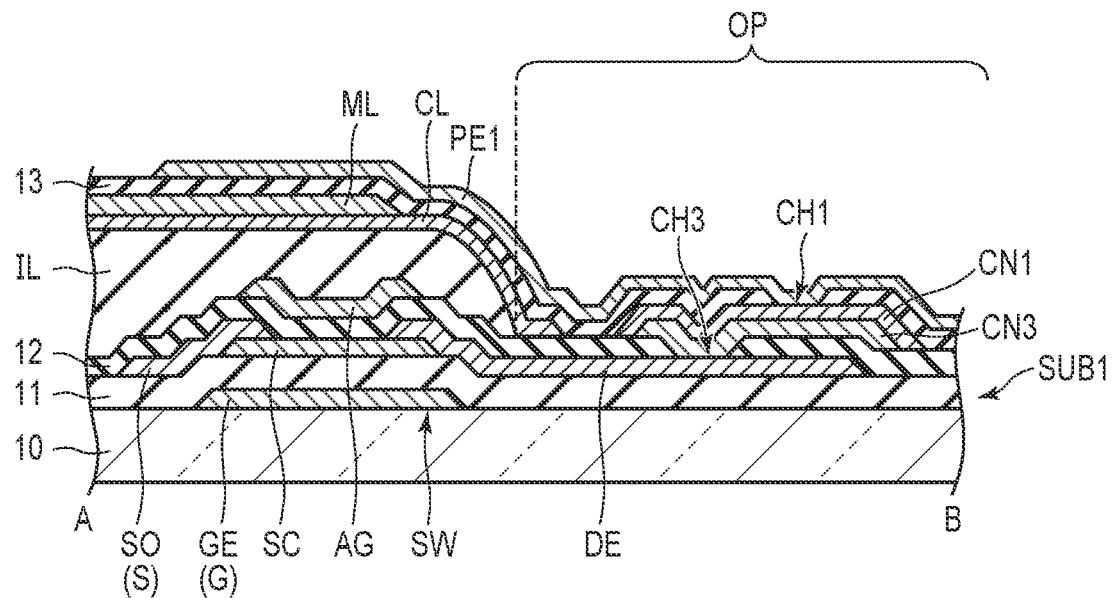
FIG. 8 is a cross-sectional view showing an example of the first substrate SUB1 along line A-B shown in FIG. 7.

FIG. 8 is a cross-sectional view showing an example of the first substrate SUB1 along line A-B shown in FIG. 7. The first substrate SUB1 comprises the first transparent substrate 10, the insulating films 11 to 13, the insulating film IL, the switching element SW, the feed line CL, the metal line ML, and the first pixel electrode PE1.

The gate electrode GE integrated with the scanning line G is arranged on the first transparent substrate 10. The insulating film 11 covers the first transparent substrate 10 and the gate electrode GE. The semiconductor SC is arranged on the insulating film 11 and is located directly above the gate electrode GE. The source electrode SO integrated with the signal line S, and the drain electrode DE are arranged on the insulating film 11, and each of the electrodes is in contact with the semiconductor SC. These source electrode SO and drain electrode DE are formed of the same material. The insulating film 12 covers the insulating film 11, the source electrode SO, and the drain electrode DE. In addition, the insulating film 12 is in contact with the semiconductor SC at a position between the source electrode SO and the drain electrode DE.

The auxiliary gate electrode AG is arranged on the insulating film 12 and is located directly above the gate electrode GE and the semiconductor SC. The connection electrode CN3 is arranged on the insulating film 12, and is in contact with the drain electrode DE in the contact hole CH3 formed in the insulating film 12. The auxiliary gate electrode AG and the connection electrode CN3 are formed of the same material. The insulating film IL covers the auxiliary gate electrode AG. In contrast, the connection electrode CN3 is located at the opening OP and is exposed from the insulating film IL.

The feed line CL is arranged on the insulating film IL. The connection electrode CN1 is arranged on the connection electrode CN3 and is in contact with the connection electrode CN3, at the opening OP. The feed line CL and the connection electrode CN1 are formed of the same material.

The metal line ML is arranged on the feed line CL and is in contact with the feed line CL. The insulating film 13 covers the feed line CL, the metal line ML, and the connection electrode CN1. In addition, the insulating film 13 is in contact with the insulating film 12 between the feed line CL and the connection electrode CN1. The first pixel electrode PE1 is arranged on the insulating film 13, and is in contact with the connection electrode CN1 in the contact hole CH1 formed in the insulating film 13. A peripheral portion of the first pixel electrode PE1 is opposed to the feed line CL and the metal line ML via the insulating film 13.

The insulating films 11 to 13 are, for example, transparent inorganic insulating films of silicon oxide, silicon nitride, silicon oxynitride or the like. The insulating film IL is, for example, a transparent organic insulating film of an acrylic resin or the like. The feed line CL, the connection electrode CN1, and the first pixel electrode PE1 are transparent electrodes formed of a transparent conductive material such as indium tin oxide (ITO) or indium zinc oxide (IZO).

Figure 9:
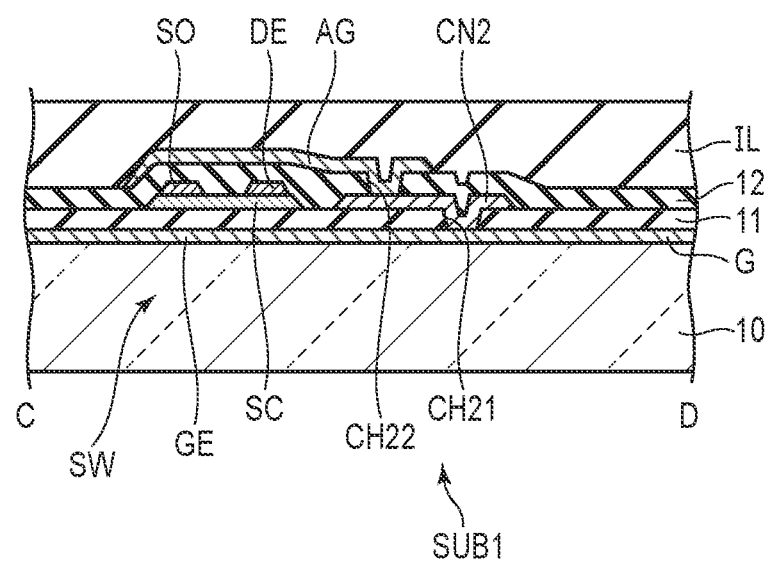
FIG. 9 is a cross-sectional view showing an example of the first substrate SUB1 along line C-D shown in FIG. 7.

FIG. 9 is a cross-sectional view showing an example of the first substrate SUB1 along line C-D shown in FIG. 7. The connection electrode CN2 is arranged on the insulating film 11, and is in contact with the scanning line G in the contact hole CH21 formed in the insulating film 11. The connection electrode CN2 is formed of the same material as the source electrode SO and the drain electrode DE. The insulating film 12 covers the insulating film 11, the connection electrode CN2, the source electrode SO, and the drain electrode DE. The auxiliary gate electrode AG is arranged on the insulating film 12, and is in contact with the connection electrode CN2 in the contact hole CH 22 formed in the insulating film 12.

Figure 10:
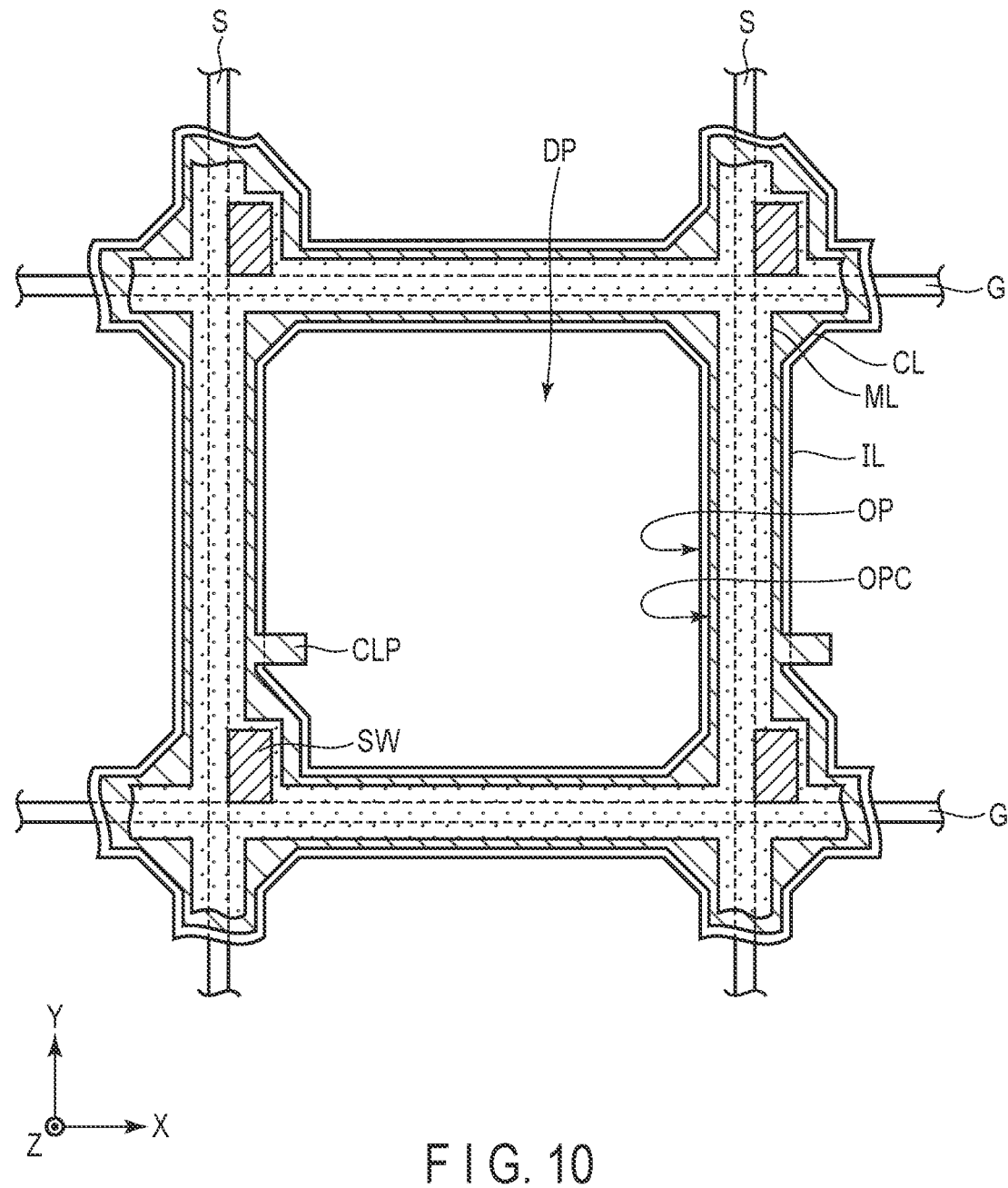
FIG. 10 is a plan view showing an example of a dummy pixel DP.

FIG. 10 is a plan view showing an example of a dummy pixel DP. The feed line CL is arranged on the insulating film IL and is formed in a grating pattern surrounding the dummy pixel DP. The metal line ML is arranged on the feed line CL and is formed in a grating pattern surrounding the dummy pixel DP. Each of the feed line CL and the metal line ML overlaps with the scanning lines G, the signal lines S, and the switching elements SW.

The dummy pixel DP shown in FIG. 10 is different from the pixel PX shown in FIG. 5 in which the feed line CL includes a protrusion CLP which protrudes to the opening OP. In other words, the island-shaped connection electrode CN1 electrically connected to the switching element SW does not exist in the dummy pixel DP.

Figure 11:
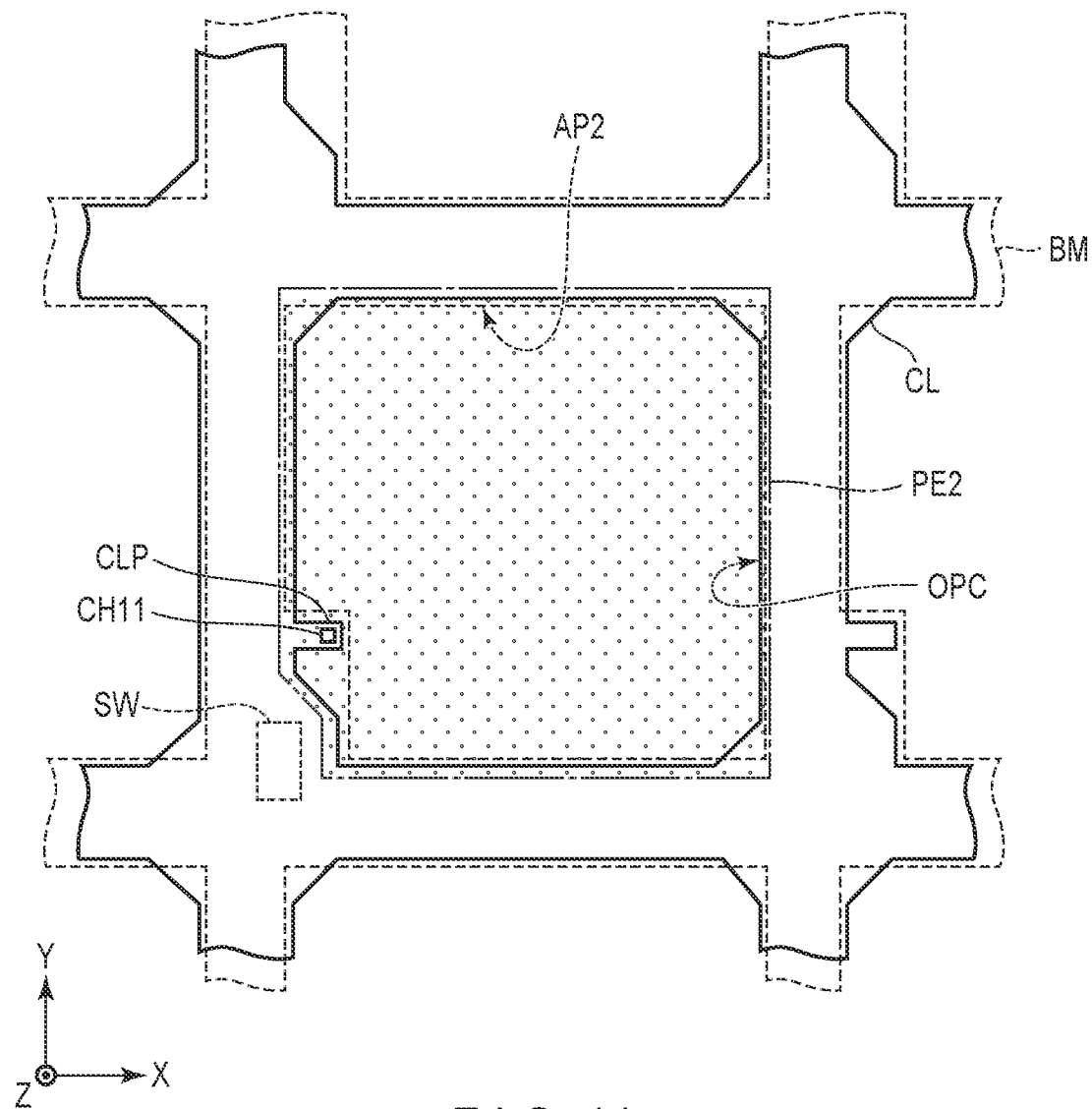
FIG. 11 is a plan view showing an example of a second pixel electrode PE2 arranged in the dummy pixel DP shown in FIG. 10.

FIG. 11 is a plan view showing an example of a second pixel electrode PE2 arranged in the dummy pixel DP shown in FIG. 10. The second pixel electrode PE2 represented by a one-dot chain line overlaps with the opening OPC of the feed line CL. In addition, the second pixel electrode PE2 overlaps with the protrusion CLP of the feed line CL. A contact hole CH11 is formed in an insulating film interposed between the second pixel electrode PE2 and the protrusion CLP. The second pixel electrode PE2 is in contact with the protrusion CLP in the contact hole CH11. Thus, the second pixel electrode PE2 is not electrically connected to the switching element SW, but electrically connected to the feed line CL.

A light-shielding layer BM provided on the second substrate SUB2 is represented by a dotted line in FIG. 11. The light-shielding layer BM is formed in a grating shape surrounding the dummy pixel DP, and overlaps with the feed line CL including the protrusion CLP, and the like, in plan view. In addition, the light-shielding layer BM includes an aperture AP2 which overlaps with the second pixel electrode PE2, in plan view. An area of the aperture AP2 is equal to an area of the aperture AP1.

Figure 12:
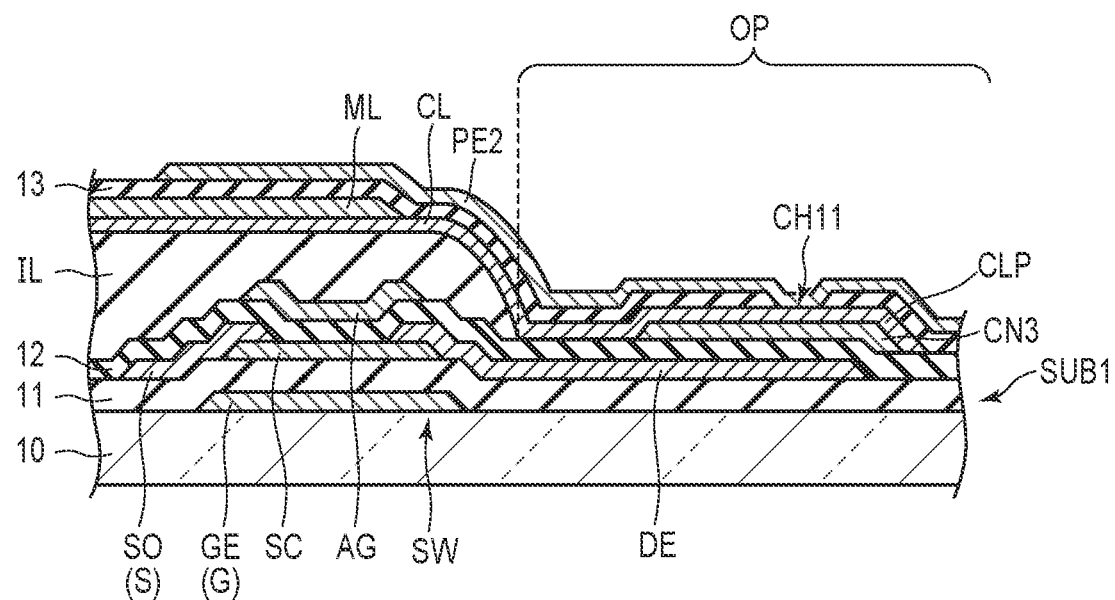
FIG. 12 is a cross-sectional view showing a first substrate SUB1 including a contact hole CH11 shown in FIG. 11.

FIG. 12 is a cross-sectional view showing the first substrate SUB1 including the contact hole CH11 shown in FIG. 11. In the example shown in FIG. 12, the switching element SW is also arranged in the dummy pixel DP, but the switching element SW may be omitted. In addition, the drain electrode DE extends directly under the protrusion CLP formed integrally with the feed line CL, but the drain electrode DE may be omitted. In addition, the protrusion CLP is in contact with the connection electrode CN3, but the connection electrode CN3 may be omitted.

The insulating film 13 covers the protrusion CLP. The second pixel electrode PE2 is arranged on the insulating film 13, and is in contact with the protrusion CLP in the contact hole CH11 formed in the insulating film 13.

Next, the light emitting module 100 will be described.

Figure 13:
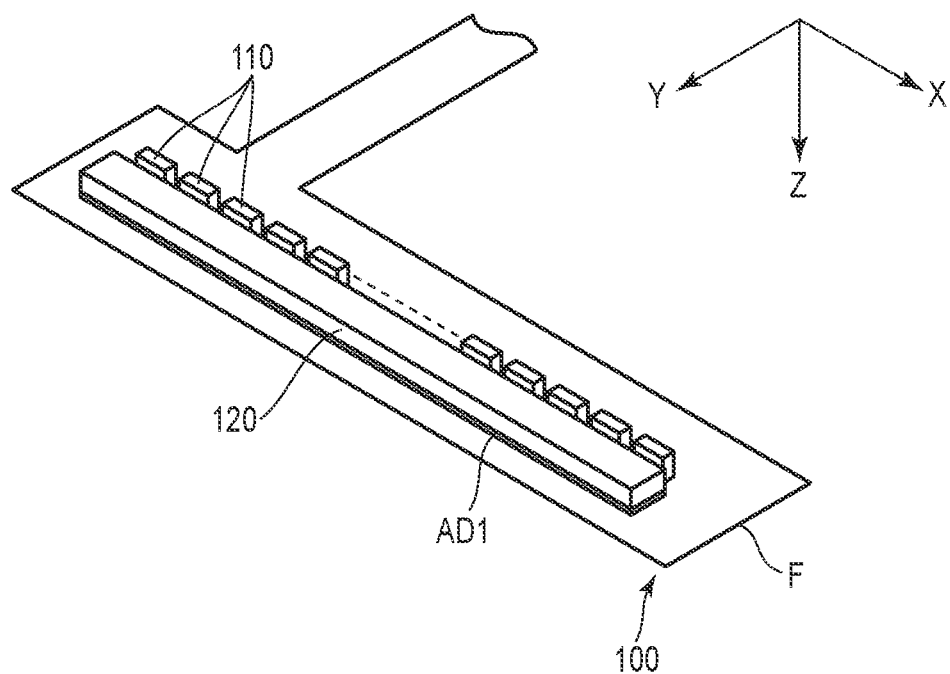
FIG. 13 is a perspective view showing an example of a light emitting module 100 shown in FIG. 1.

FIG. 13 is a perspective view showing an example of the light emitting module 100 shown in FIG. 1. The light emitting module 100 comprises a wiring board F, an adhesive layer AD1, a plurality of light emitting elements 110, and a light guide (prism lens) 120.

The wiring board F is, for example, a flexible printed circuit board that can be bent. The plurality of light emitting elements 110 are arranged at intervals along the first direction X and are electrically connected to the wiring board F. The light emitting elements 110 are, for example, white light sources that emit white light. The light guide 120 is formed of, for example, resin and shaped in a transparent rod, and extends along the first direction X. The light guide 120 is bonded to the wiring board F by the adhesive layer AD1. The plurality of light emitting elements 110 face the light guide 120 in the second direction Y.

FIG. 14 is a perspective view showing a state in which the light emitting module 100 shown in FIG. 13 is arranged on the display panel PNL. In FIG. 14, the light emitting elements 110 of the light emitting module 100 are represented by solid lines, the light guide 120 is represented by a dotted line, the display panel PNL is represented by a one-dot chain line, and illustration of the other members is omitted.

The light emitting module 100 is arranged on the extending portion Ex. The light guide 120 is arranged between the light emitting elements 110 and the side surface 201. The light emitting elements 110 include light emitting portions EM opposed to the light guide 120.

The light emitted from the light emitting portion EM of each of the light emitting elements 110 is made incident on the light guide 120. The light made incident on the light guide 120 is diffused moderately at the light guide 120 and is made incident from the side surface 201 on the display panel PNL.

Figure 15:
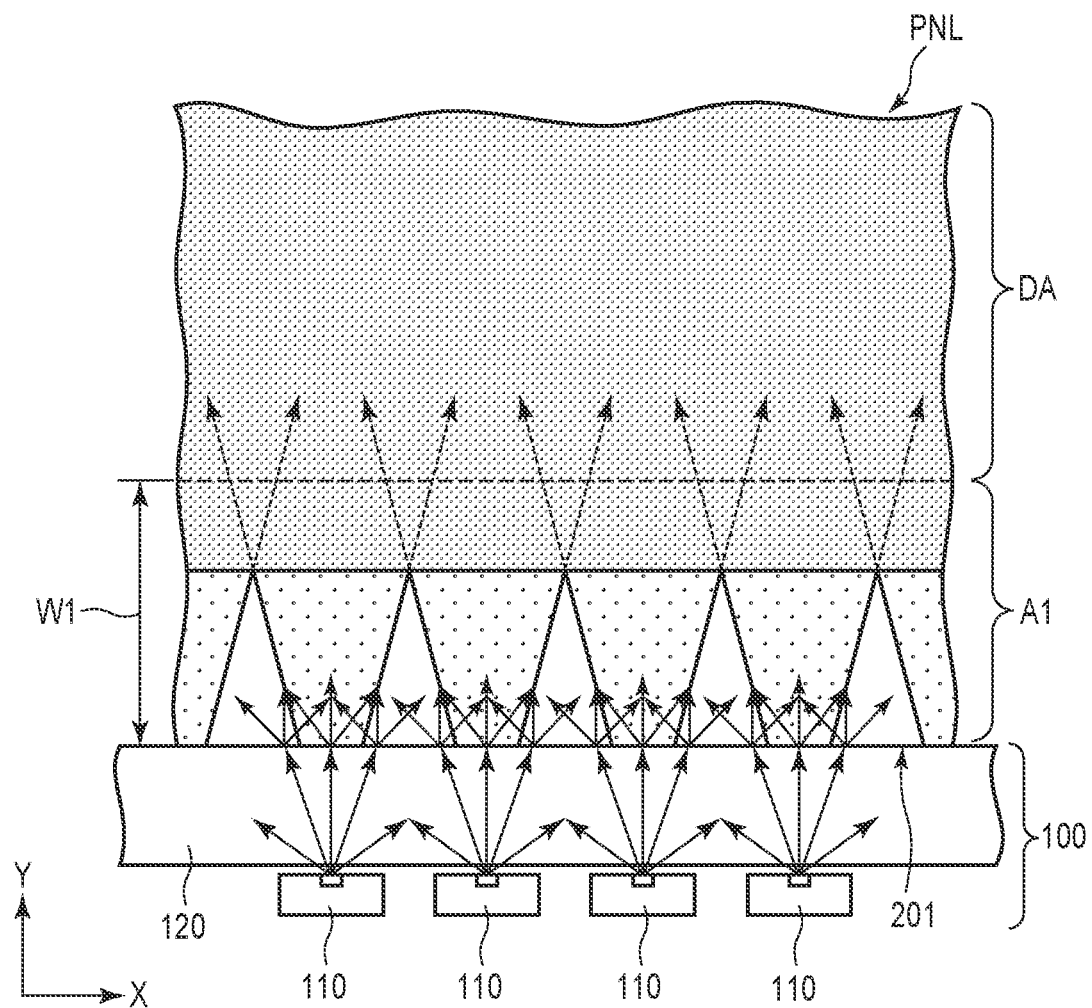
FIG. 15 is a plan view showing a condition of propagation of light emitted from light emitting elements 110.

FIG. 15 is a plan view showing a condition of propagation of the light emitted from the light emitting elements 110. The light emitted from each of the adjacent light emitting elements 110 is made incident on the light guide 120, and is made incident on the display panel PNL after diffused moderately at the light guide 120. In the vicinity of the side surface 201, the light from the adjacent light emitting elements 110 is not sufficiently mixed, but is likely to become different in luminance, as schematically shown in the figure.

In the embodiments, the first width W1 of the first area A1 is set as a size enough to mix the light from the adjacent light emitting elements 110. For this reason, stripe-shaped non-uniformity in display which results from brightness and darkness of the light is suppressed, and the degradation in display quality can be suppressed, in the display area DA.

In addition, in some cases, the liquid crystal material injected from the inlet SI has lower fluidity at a position farther from the inlet SI, and does not spread easily to an area which is in contact with the sealant SE. For this reason, the degree of diffusion of the incident light may be different and visually recognized as non-uniformity in the area close to the inlet SI and the area separated from the inlet SI.

In the embodiments, as shown in FIG. 1, the inlet SI is formed on a side opposite to the side where the light emitting module 100 is arranged, with the display area DA sandwiched therebetween. Furthermore, in the non-display area where the liquid crystal layer LC is arranged, the first area A1 on the side opposite to the inlet SI is formed to be wider than the second area A2 close to the inlet SI. For this reason, even if the liquid crystal material does not spread easily in the first area A1, the non-uniformity in display of the images displayed in the display area DA is suppressed, and the degradation in display quality can be suppressed.

In addition, in the first area A1, the dummy pixel DP constituted similarly to the pixel PX of the display area DA is arranged, and the first pixel electrode PE1 arranged at the pixel PX and the second pixel electrode PE2 arranged at the dummy pixel DP are opposed to the apertures AP1 and AP2 of the light-shielding layer BM, respectively. For this reason, the light can also be transmitted through the dummy pixel DP, similarly to the pixel PX, the transparency of the display panel PNL can be improved, and appearance of the dummy pixel DP and the pixel PX can be made the same as each other.

Next, a configuration example of the display device DSP according to the embodiments will be described.

Figure 16:
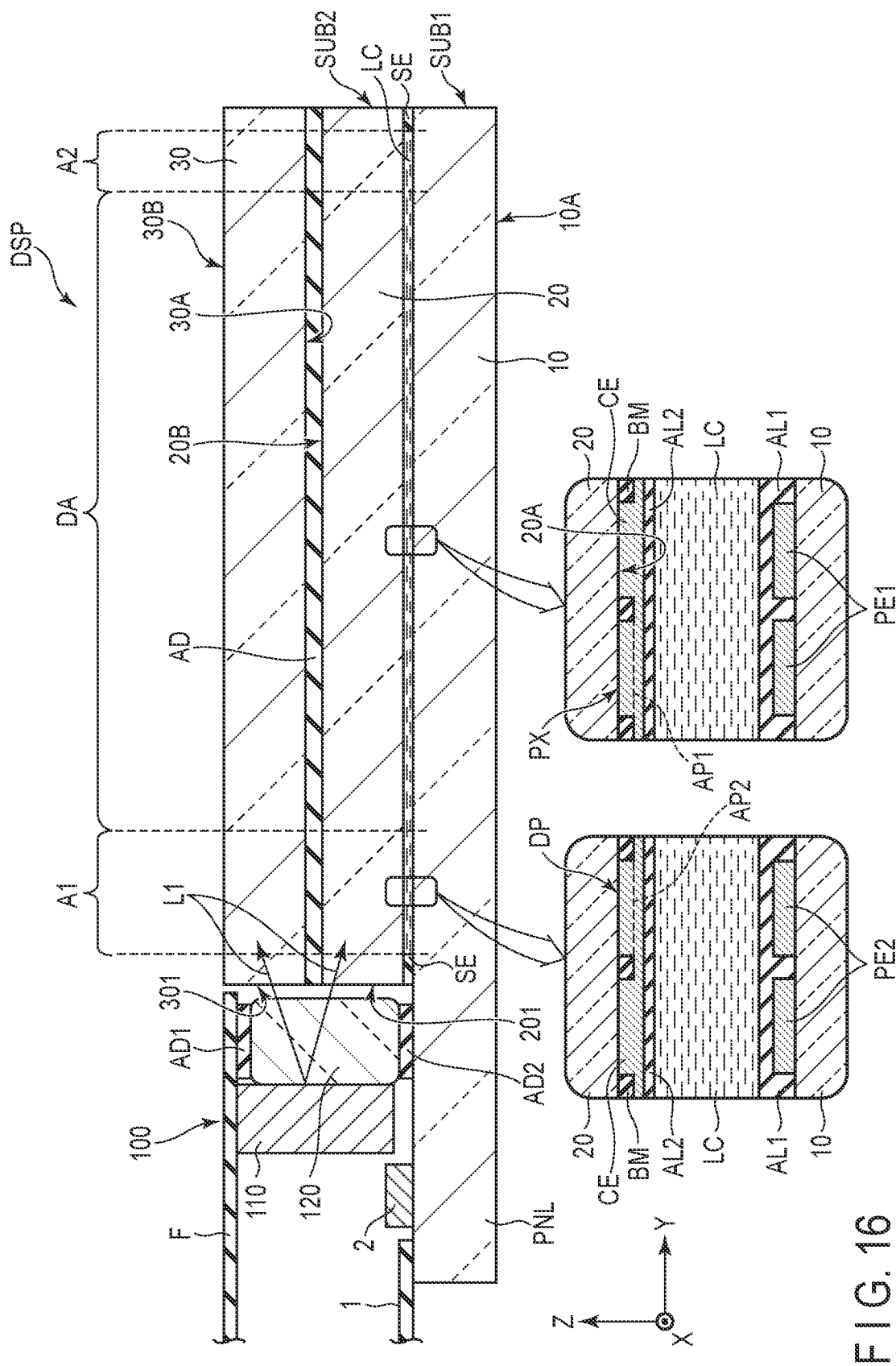
FIG. 16 is a cross-sectional view showing the display device DSP.

FIG. 16 is a cross-sectional view showing the display device DSP. The only main parts of the display panel PNL are simplified and illustrated. The first pixel electrode PE1 of the display area DA, and the second pixel electrode PE2 of the first area A1 are covered with the alignment film AL1. The light-shielding layer BM including the apertures AP1 and AP2 is arranged on an inner surface 20A of the second transparent substrate 20. The aperture AP1 is opposed to the first pixel electrode PE1 in the third direction Z, and the aperture AP2 is opposed to the second pixel electrode PE2 in the third direction Z. The common electrode CE is arranged over the display area DA and the first area A1, and opposed to the first pixel electrode PE1 and the second pixel electrode PE2 in the third direction Z. The common electrode CE is covered with the alignment film AL2.

The display panel PNL further comprises a third transparent substrate 30 in addition to the first substrate SUB1 and the second substrate SUB2. An inner surface 30A of the third transparent substrate 30 is opposed to an outer surface 20B of the second transparent substrate 20 in the third direction Z. An adhesive layer AD bonds the second transparent substrate 20 and the third transparent substrate 30. The third transparent substrate 30 is, for example, a glass substrate, but may be an insulating substrate such as a plastic substrate. The third transparent substrate 30 has a refractive index equivalent to the refractive indexes of the first transparent substrate 10 and the second transparent substrate 20. The adhesive layer AD has a refractive index equivalent to the refractive index of each of the second transparent substrate 20 and the third transparent substrate 30.

A side surface 301 of the third transparent substrate 30 is located directly above the side surface 201 of the second transparent substrate 20. The light emitting element 110 of the light emitting module 100 is provided between the first substrate SUB1 and the wiring board F in the third direction Z. The light guide 120 is provided between the light emitting element 110 and the side surface 201 and between the light emitting element 110 and the side surface 301, in the second direction Y. The light guide 120 is bonded to the wiring board F by the adhesive layer AD1 and is bonded to the first substrate SUB1 by the adhesive layer AD2.

Next, light L1 emitted from the light emitting element 110 will be described with reference to FIG. 16.

The light emitting element 110 emits the light L1 toward the light guide 120. The light L1 emitted from the light emitting element 110 propagates along a direction of an arrow indicating the second direction Y, passes through the light guide 120, and is made incident on the second transparent substrate 20 from the side surface 201, and also made incident on the third transparent substrate 30 from the side surface 301. The light L1 made incident on the second transparent substrate 20 and the third transparent substrate 30 propagates through the inside of the display panel PNL while repeatedly reflected.

The light L1 made incident on the liquid crystal layer LC to which no voltage is applied is transmitted through the liquid crystal layer LC without being substantially scattered. In addition, the light L1 made incident on the liquid crystal layer LC to which a voltage is applied is scattered by the liquid crystal layer LC. Each pixel PX in the display area DA can be changed to a state (transparent state) in which the voltage is not applied to the liquid crystal layer LC or a state (scattered state) in which the voltage is applied to the liquid crystal layer LC. The dummy pixel DP in the first area A1 is held in the state (transparent state) in which the voltage is not applied to the liquid crystal layer LC.

This display device DSP can be observed not only from the outer surface 10A side of the first transparent substrate 10, but also from the outer surface 30B side of the third transparent substrate 30. In addition, even when the display device DSP is observed from the outer surface 10A side or observed from the outer surface 30B side, a background of the display device DSP can be observed via the display device DSP.

As explained above, according to the embodiments, a display device capable of suppressing degradation in display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a first substrate comprising a first glass substrate, a first switching element arranged in a display area, a first pixel electrode electrically connected to the first switching element, a second pixel electrode arranged outside the display area, and a feed line;
   a second substrate comprising a second glass substrate, and a common electrode facing the first pixel electrode and the second pixel electrode;
   a sealant bonding the first substrate with the second substrate;
   a liquid crystal layer surrounded by the sealant between the first substrate and the second substrate, and containing polymer dispersed liquid crystal;
   a third glass substrate comprising a side surface and bonded to the second glass substrate with an adhesive layer; and
   a light emitting module arranged along the side surface, wherein
   the feed line is at a same potential as the common electrode,
   the sealant comprises a first portion along the side surface between the light emitting module and the display area, and
   the second pixel electrode is electrically connected to the feed line in a region between the first portion of the sealant and the display area.

2. The display device of claim 1, wherein
   the first substrate further comprises a plurality of signal lines arranged at intervals in a first direction, and a plurality of scanning lines arranged at intervals in a second direction orthogonal to the first direction,
   the sealant comprises a second portion which faces the first portion across the liquid crystal layer in the second direction, and
   a first width in the second direction between the first portion and the display area is larger than a second width in the second direction between the second portion and the display area.

3. The display device of claim 1, wherein
   the second substrate further comprises a light shielding layer,
   the light shielding layer comprises openings facing the first pixel electrode and the second pixel electrode, respectively, and
   in a region between the first portion and the display area, a background on an outer surface side of the third glass substrate is observable from an outer surface side of the first glass substrate, and a background on the outer surface side of the first glass substrate is observable from the outer surface side of the third glass substrate.

4. The display device of claim 1, wherein the feed line is formed in a grating pattern, and comprises a first opening at a position overlapping the first pixel electrode and a second opening at a position overlapping the second pixel electrode, the first pixel electrode is connected to the first switching element at the first opening, the feed line comprises a protrusion which protrudes toward the second opening, and the second pixel electrode is connected to the protrusion.

5. The display device of claim 4, wherein the first substrate further comprises an organic insulating film between the first glass substrate and the feed line, and the organic insulating film comprises openings facing the first pixel electrode and the second pixel electrode, respectively.

* * * * *